United States Patent [19]

Riganati et al.

[11] 4,003,024
[45] Jan. 11, 1977

[54] TWO-DIMENSIONAL BINARY DATA ENHANCEMENT SYSTEM

[75] Inventors: John P. Riganati, Yorba Linda; Visvaldis A. Vitols, Orange, both of Calif.

[73] Assignee: Rockwell International Corporation, El Segundo, Calif.

[22] Filed: Oct. 14, 1975

[21] Appl. No.: 621,724

[52] U.S. Cl. .............. 340/146.3 H; 340/146.3 MA
[51] Int. Cl.² .......................................... G06K 9/12
[58] Field of Search ......... 340/146.3 H, 146.3 MA, 340/146.3 AG, 146.3 E

[56] References Cited

UNITED STATES PATENTS

| | | | |
|---|---|---|---|
| 3,196,398 | 7/1965 | Baskin .................. | 340/146.3 H |
| 3,560,930 | 2/1971 | Howard .................. | 340/146.3 H |
| 3,846,754 | 11/1974 | Oka et al. ............... | 340/146.3 MA |
| 3,940,737 | 2/1976 | Beun .................... | 340/146.3 H |

Primary Examiner—Leo H. Boudreau
Attorney, Agent, or Firm—H. Fredrick Hamann; Rolf M. Pitts; George Jameson

[57] ABSTRACT

A system for enhancing a binary data bit stream derived from a two-dimensional pattern image wherein, in a preferred embodiment, each data bit in the bit stream and a preselected group of bits associated therewith are sequentially stored in a first location and in associated preselected locations, respectively, of a storage circuit of a first enhancement stage. The bits associated with each data bit are utilized as an address to cause a read only memory to develop a decision bit as a function of the address. A gating circuit develops an output bit in response to each data bit and its associated decision bit. The sequence of output bits forms an enhanced data bit stream which appears at the output of the first enhancement stage for further application to one or more additional cascaded enhancement stages.

6 Claims, 16 Drawing Figures

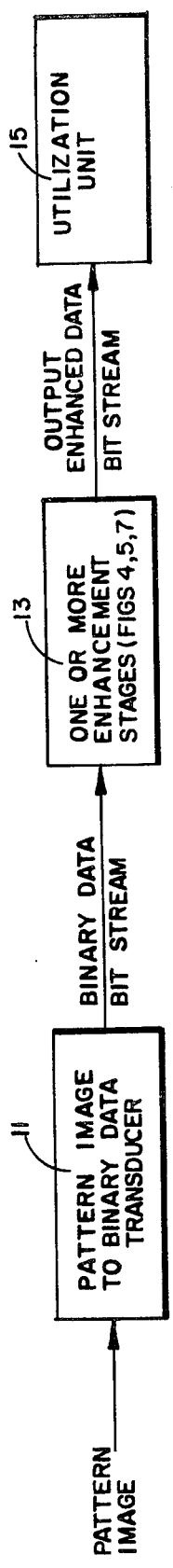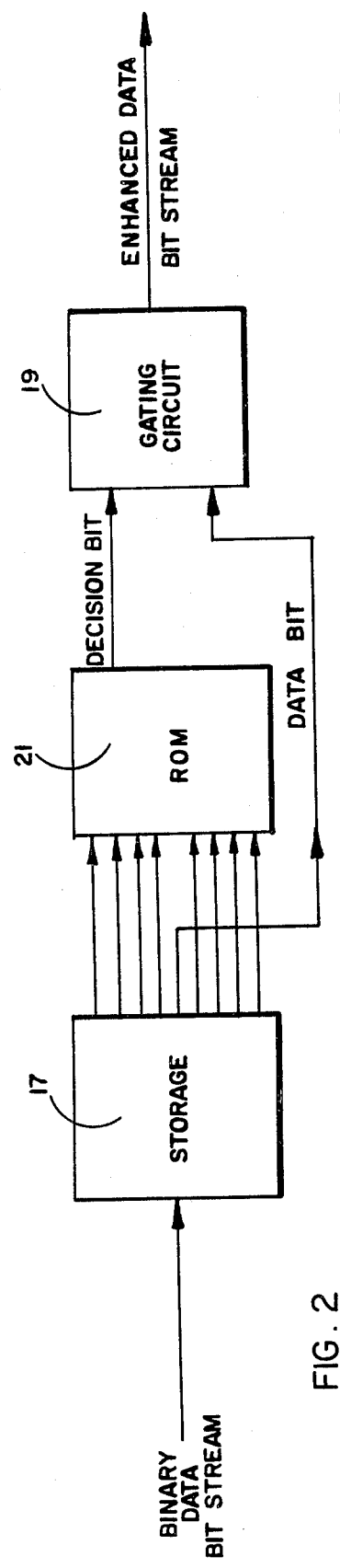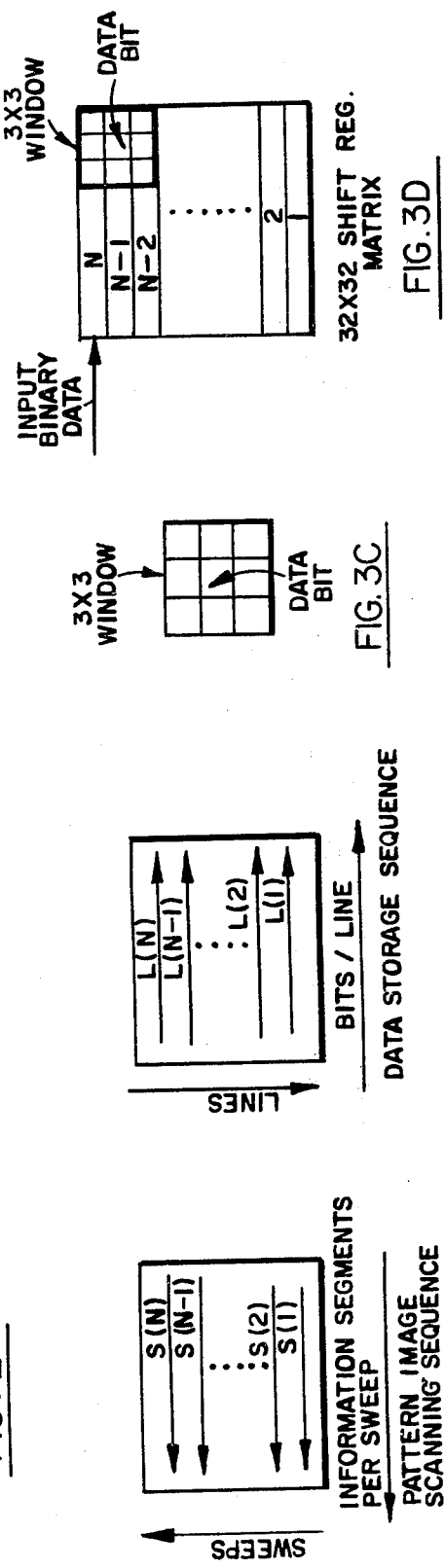

FIG. 8A

| o | o | o |
|---|---|---|
| o | o | o |
| — | — | — |

FIG. 8B

| o | o | o |
|---|---|---|
| o | — | o |
| — | — | — |

FIG. 9A

| — | — | — |
|---|---|---|
| — | o | — |
| o | o | o |

FIG. 9B

| — | — | — |
|---|---|---|
| — | — | — |
| o | o | o |

FIG. 10A

| — | o | o |
|---|---|---|
| — | o | o |
| — | — | — |

FIG. 10B

| — | o | o |
|---|---|---|
| — | — | o |
| — | — | — |

4,003,024

TWO-DIMENSIONAL BINARY DATA ENHANCEMENT SYSTEM

BACKGROUND OF THE INVENTION

1. Field of the Invention

This invention relates to pattern recognition systems and particularly to a system for enhancing two-dimensional binary data.

2. Decription of the Prior Art

In the prior art different enhancement techniques have been employed to enhance two-dimensional pattern images for pattern recognition applications.

One enhancement technique is a complex subsystem that is integrally a part of a complex pattern recognition digital computer, as taught in U.S. Pat. No. 3,581,281. In this pattern recognition computer, a sensed image is digitally stored in a matrix of memory elements which are selectively addressed. The values of the addressed memory elements are stored and summed in an accumulator. Signals from the accumulator above a predetermined threshold are distributed for further signal accumulation and thresholding before output signals are derived and supplied to indicators.

Another proposed character recognition system is the IBM 1975 Optical Page Reader which utilizes equipment to recognize more than 200 type fonts of characters, with part of that equipment employing an adaptive process to enhance the gray level data by converting it to binary data and then simplifying this binary data in a complex processing manner. Descriptions of parts of this proposed system can be found in the published articles on "The IBM 1975 Optical Page Reader," Parts I, II and III, contained in IBM J. Res. Develop. 12, No. 5, pages 346–371 (September 1968). Part II (pages 354–363) includes a discussion related to the enhancement of character data. The enhancement technique disclosed in Part II relies on a relatively complex hybrid of analog and digital processing.

Other proposed systems utilize circular scanning techniques to derive redundant binary information. Any enhancement of the resultant binary information is directed essentially to removing or minimizing the redundancy rather than an actual enhancement of the pattern image.

In all of the above known equipments, complex circuitry and processing is required for enhancing the two-dimensional binary data derived from sensing a pattern image. In addition, in some of these prior art systems, the enhancement technique does not result in a high degree of enhancement of the two-dimensional binary data. None of these proposed systems teach an essentially simple structure which can achieve a high degree of enhancement of two-dimensional binary data.

SUMMARY OF THE INVENTION

Briefly an improved system is provided for enhancing two-dimensional binary data. The two-dimensional data is applied to one or more cascaded enhancement stages. In a preferred embodiment, the enhancement in any given stage is achieved by determining whether or not a preselected data bit or signal from a three bit-by-three bit window in a matrix should be changed as a function of the pattern of the eight other bits in that window. Essentially those eight bits in the window are used to address a read only memory (ROM) to cause it to provide a decision bit or signal having a stored binary state which is a function of which one of 256 addresses is being applied. Each ROM may store different preselected bits in its 256 address locations, depending upon the desired system operation. The decision bit is utilized by a gating circuit to either cause the data bits to be inverted or repeated. The sequence of data bits is the enhanced binary output which may be applied to a following stage for additional enhancement.

It is therefore an object of this invention to provide an improved two-dimensional binary data enhancement system.

Another object of this invention is to provide an efficient, compact, relatively simple and inexpensive system which provides a relatively high degree of enhancement of two-dimensional binary data.

Another object of this invention is to provide a multistage pipelined system whereby each stage in the sequence can either perform a thinning or filling enhancement operation on two-dimensional binary data being applied to its input.

Another object of this invention is to provide at recognition one enhancement stage wherein a selected one of fill and thin operations is performed on each data bit as a function of the binary state of the data bit and the pattern of the address bits associated with that data bit.

A further object of this invention is to provide a system of cascaded enhancement stages wherein each stage essentially enhances its input two-dimensional binary data by determining whether or not the center bit of a 3 bit by 3 bit window should be changed as a function of the relative states or pattern of the 8 bits surrounding the center bit.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein: recognition FIG. 1 illustrates a block diagram of a pattern recongition system which incorporates the invention;

FIG. 2 illustrates a simplified block diagram of one embodiment of the enhancement stages of the invention;

FIGS. 3a, 3b, 3c, 3d illustrate operational aspects useful in explaining the basic operation of the invention;

FIGS. 8a, 8b, 9a, 9b, 10a and 10b illustrate window patterns useful in explaining the operation of the enhancement stage of FIG. 7.

DESCRIPTION OF THE PREFERRED EMBODIMENT

Figures 4, 5:
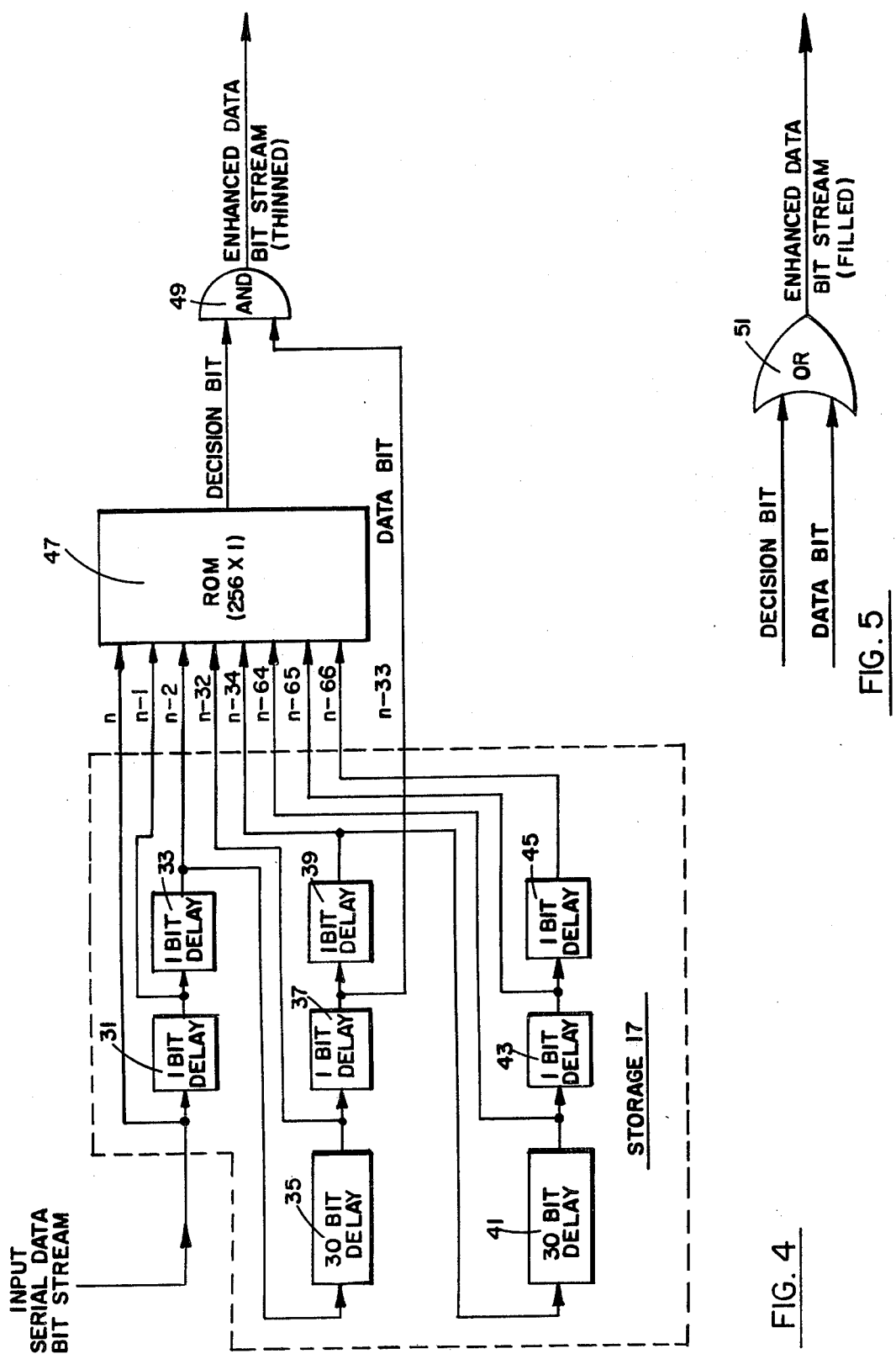
FIG. 4 illustrates a block diagram of one embodiment of an enhancement stage which is used to perform a thinning operation on the input two-dimensional binary data.
FIG. 5 illustrates a modification that can be made in FIG. 4 to enable the modified enhancement stage of FIGS. 4 and 5 to perform a filling operation on the input two-dimensional bianry data.

Referring now to the drawings, FIG. 1 discloses a basic pattern recognition system which incorporates the invention. A pattern image of, for example, a fingerprint or other optical character is applied to a pattern image-to-binary data transducer 11. The transducer 11 may utilize any suitable sensor, such as a flying spot scanner or a matrix of photoresistor cells, and thresholding means for cooperatively converting the scanned optical image into a binary data bit stream. Dark areas of the scanned optical image may be converted to binary "1" state signals, while lighter areas of that image below a preselected threshold may be converted to binary "0" state signals. The output of the transducer 11 is therefore two-dimensional binary data. The binary data from the transducer 11 is enhanced by one or more enhancement stages 13, with the output enhanced binary data bit stream therefrom being applied to a utilization unit 15. The utilization unit 15 can include the remaining part of the overall pattern recognition system of FIG. 1. For example, if FIG. 1 represented a fingerprint identification system, then the utilization unit 15 could include a unit for displaying the enhanced fingerprint image, an automatic fingerprint reader for reading minutiae data from the enhanced fingerprint image, an automatic fingerprint classifier for classifying the enhanced fingerprint according to the derived minutiae data, and an automatic fingerprint matcher for matching the classified fingerprint with a plurality of previously stored classified fingerprints to obtain a possible fingerprint identification.

One embodiment of the enhancement stages 13 of FIG. 1 is basically illustrated in FIG. 2. The two-dimensional binary data bit stream from transducer 11 is serially applied to storage unit 17, which may comprise a plurality of shift registers serially arranged in two-dimensional form. At each bit time, a data bit in a preselected location of the storage unit 17 is applied to a gating circuit 19. At the same bit time the states or pattern of the bits in preselected locations of the storage unit 17, that are associated with the data bit, are used as the associated address for a read only memory (ROM) 21. In response to each associated address, the ROM 21 develops a decision bit as a function of the pattern of the bits in the preselected locations at that time. As a function of the state of the decision bit, the gating circuit 19 either repeats or inverts the state of the data bit. The sequence of inverted and/or repeated data bits forms an enhanced data bit stream which, if so desired, can be applied to a following cascaded enhancement stage for additional enhancement. This enhanced data bit stream from the gating circuit 19 is still two-dimensional binary data because each of the bits in the bit stream is still related to the overall pattern of the other bits in the bit stream. Furthermore, it should be understood that as many cascaded enhancement stages 13 as desired can be utilized to achieve the desired degree of enhancement for the particular type of pattern recognition operation being used.

FIGS. 3a, 3b, 3c and 3d illustrate operational aspects which are helpful in explaining the operation of the invention. FIG. 3a illustrates one possible sequence which the transducer 11 (FIG. 1) may employ to scan the pattern image. In this illustrated scanning sequence the pattern image is scanned from right to left and bottom to top to generate the sweeps S(1), S(2) . . . S(N-1) and S(N), where S(1) represents the first sweep S(2) represents the second sweep, . . . and S(N) represents the Nth or uppermost sweep. Information segments are developed on each sweep which are converted to binary data or bits, as discussed previously. In FIG. 3b, the data storage sequence is shown, whereby the two-dimensional binary data in lines or registers (not shown) L(1), L(2) . . . L(N-1) and L(N) of the storage unit 17 correspond in bit and line position to the sweep information segments and sweeps S(1), S(2) . . . S(N-1) and S(N) of FIG. 3B. By comparing FIGS. 3A and 3B, it can be seen that the binary data stored in the storage unit 17 (FIG. 2) has the same relative two-dimensional orientation as the portions of the pattern image from which the binary data was derived.

One way that the data bit and decision bit of FIG. 2 can be derived is by taking a three bit-by-three bit window (FIG. 3C) and scanning that over each bit stored in the storage unit 17 depicted in FIG. 3B. The center bit of that three bit-by-three bit matrix or window in FIG. 3C could be the data bit shown in FIG. 2, while the pattern of the eight bits surrounding the data bit could be used as the eight-bit address shown in FIG. 2. A three bit-by-three bit window requires 256 different addresses or patterns for the ROM 21 (FIG. 2). Hence the ROM 21 has to store 256 results for a three bit-by-three bit window. If, for example a 5 bit-by-5 bit window were chosen, there would be twenty four bits surrounding the data bit and the ROM 21 would require a capacity of $2^{24}$ results. Such a ROM capacity appears to be economically beyond the present known state of the art.

The center bit of the window does not necessarily have to be chosen as the data bit. Some other position in the window could have been chosen from which to derive the data bit. The important consideration is that the remaining bits in the window have some pattern relationship with respect to the data bit.

An alternative approach to sweeping the window through the binary data is to sweep the binary data through the window. This approach is illustrated in FIG. 3D where, for example, a 3 bit-by-3 bit window is located in the upper right hand corner of a 32 by 32 shift register (SR) matrix. However, it should be understood that the window could be put anywhere within the 32 × 32 matrix. This matrix may be formed by 32 shift registers, each being 32 bits in length or being comprised of 32 serially coupled flip flop stages (not shown). The serial binary data is sequentially shifted from left to right through each of the shift registers designated in FIG. 3D as N, N-1 . . . 2 and 1, with the output of a given shift register being applied to the input of the shift register located directly beneath that given shift register. It can therefore be seen that the binary data is stored in the same shift register format in FIG. 3D as it is in FIG. 3B. The data bit is illustrated in FIG. 3D as being taken from the second to last stage of the second shift register from the top, while the remaining eight bits in the window are selectively taken from the last three stages of the uppermost three shift registers.

Referring now to FIG. 4, a more detailed block diagram is shown of a first embodiment of an enhancement stage 13 which enhances the two-dimensional data by means of a thinning operation. In FIG. 4 the storage unit 17 is shown in a more simplified form than that shown in FIG. 3D. In FIG. 3D it should be noted that all of the shift registers beneath the uppermost three shift registers are superfluous and have therefore been eliminated from the storage unit 17 illustrated in FIG. 4. It should be further noted that all of the stages in the uppermost shift register that lie to the left of the window in FIG. 3D are likewise unnecessary and have also been eliminated from the storage unit 17 of FIG. 4. The remaining portions of the storage unit 17 are illustrated as delay circuits, which may be flip flops.

The input serial data bit stream from the transducer 11, or from a preceding enhancement stage 13, is serially applied through one-bit delay circuits 31 and 33. The output of the circuit 33 is then applied through a 30 bit delay circuit 35 before being serially applied through one bit delay circuits 37 and 39. In a like manner, the output of the circuit 39 is applied through a 30 bit delay circuit 41 before being serially applied through one bit delay circuits 43 and 45. In this manner a three bit-by-three bit window is formed in FIG. 4 in the same manner as indicated in FIG. 3D. More specifically, the top row of the window is comprised of the present input bit being applied to the input of the circuit 31 and the output bits of the circuits 31 and 33, which are respectively designated as the $n$, $n-1$ and $n-2$ bits. Similarly, the middle row of the window is comprised of the output bits of the circuits 35, 37 and 39, which are respectively designated as the $n-32$, $n-33$ and $n-34$ bits. Finally, the bottom row of the window is comprised of the output bits of the circuits 41, 43 and 45, which are respectively designated as the $n-64$, $n-65$ and $n-66$ bits. The $n$-bit is the bit that is presently being applied to the input of the circuit 31, the $n-1$ bit is the bit in the bit stream that appeared at the input of the circuit 31 one bit time before the present time . . . and the n-66 bit is the bit in the bit stream that appeared at the input of the circuit 31 66 bit times before the present time.

The n-33 bit is the center bit of the window and, in this illustration, is used as the data bit or data signal. The $n$, $n-1$, $n-2$, $n-32$, $n-34$, $n-64$, $n-65$ and $n-66$ bits form the address for the ROM 47. As discussed previously, the ROM 47 stores 256 one-bit outputs when a three bit-by-three bit window is employed, since there are 256 different binary patterns for an eight bit address. It should also be noted that while the locations of the address bits that form the address may be the same for the ROMs in the enhancement stages being used, the bits in that address are not necessarily the same, since some will be changed in the manner previously discussed. Furthermore, the stored contents of the different ROMs may be different even for the same address. This feature is illustrated in Table I (to be discussed).

There are a large number of degrees of freedom that could be used in storing the binary information in the address locations of any given ROM. Given a particular address a ROM output is basically dependent upon the address and the particular function desired of that particular ROM. One ROM may be programmed to perform a filling operation while another ROM may be programmed to perform a thinning operation. The design of a ROM and its contents is dependent upon the particular application and desired operation of the overall system.

The $n$-33 data bit or data signal from delay circuit 37 and the decision bit or decision signal from the ROM 47 are applied as inputs to an AND gate 49. The AND gate 49 is used in conjunction with the ROM address and contents of the ROM 47 to perform a thinning operation. By this means the AND gate 49 will only develop a binary "1" output when both the data bit and decision bit are in binary 1 states. The AND gate will therefore develop a thinned output bit, or a binary "0", if either the data bit or the decision bit is in a "0" state. The stream of enhanced data bits from the AND gate 49 will therefore contain fewer 1 state bits than the input serial data bit stream being sequentially applied to the input of the delay circuit 31.

The enhancement stage of FIG. 4 can be modified, as indicated in FIG. 5, to perform a filling operation. When the OR gate 51 of FIG. 5 is substituted for the AND gate 49 of FIG. 4 and the ROM contents are suitably programmed by the use of, for example, a computer (not shown), the resultant modified enhancement stage will perform a filling operation. The OR gate 51 will develop a binary 1 output when either or both of the data and decision bits is in a binary 1 state. Even when the data bit $n$-33 is a binary 0, a binary 1 can be developed by the OR gate 51 if the decision bit is in "1" state. The circuit of FIG. 4 as modified by FIG. 5 can therefore perform a filling operation (on holes and gaps), since the stream of enhanced data bits from the OR gate 51 will contain more 1 state bits than the input serial data bit stream being sequentially applied to the input of the delay circuit 31.

Figure 6:
FIG. 6 illustrates the enhancement of a central portion of a fingerprint by a sequence of filling and thinning enhancement operations.

The results of enhancing a fingerprint can be seen in FIG. 6. The rectangular central portion of the fingerprint of FIG. 6 is shown enhanced as a result of various filling and thinning operations while, in contrast, the remaining unenhanced portion of the fingerprint of FIG. 6 is shown still containing holes and missing and thick portions. The enhanced portion of the fingerprint of FIG. 6 was derived by selectively using combinations of six different types of enhancement stages (A, B, C, D, E and F) to perform filling and thinning operations. As can be seen in FIG. 6, enhancement basically entails the removal or minimizing of undesirable variations without changing the essence of the pattern being processed.

The following Table I illustrates the various outputs from the enhancement stages A, B, C, D, E and F when addressed with addresses 0, 1, 2 . . . 255.

TABLE I

| INPUT ADDRESS | ROM Outputs ||||||  INPUT ADDRESS | ROM Output ||||||  INPUT ADDRESS | ROM Output ||||||
| | A | B | C | D | E | F | | A | B | C | D | E | F | | A | B | C | D | E | F |
|---|---|---|---|---|---|---|---|---|---|---|---|---|---|---|---|---|---|---|---|---|
| 0 | 1 | 1 | 1 | 1 | 1 | 1 | 43 | 1 | 1 | 1 | 1 | 1 | 1 | 86 | 1 | 1 | 1 | 0 | 1 | |
| 1 | 1 | 1 | 1 | 1 | 1 | 1 | 44 | 1 | 1 | 1 | 1 | 1 | 1 | 87 | 1 | 1 | 1 | 1 | 1 | 1 |
| 2 | 1 | 1 | 1 | 1 | 1 | 1 | 45 | 1 | 1 | 1 | 1 | 1 | 1 | 88 | 1 | 0 | 1 | 0 | 1 | 1 |
| 3 | 1 | 1 | 0 | 1 | 1 | 1 | 46 | 1 | 1 | 1 | 1 | 1 | 1 | 89 | 1 | 0 | 1 | 1 | 1 | 1 |
| 4 | 1 | 1 | 1 | 1 | 1 | 1 | 47 | 1 | 1 | 1 | 1 | 1 | 1 | 90 | 1 | 1 | 1 | 1 | 1 | 1 |
| 5 | 0 | 1 | 0 | 1 | 1 | 1 | 48 | 1 | 1 | 1 | 0 | 1 | 1 | 91 | 1 | 1 | 1 | 1 | 1 | 1 |
| 6 | 0 | 1 | 1 | 1 | 1 | 1 | 49 | 1 | 1 | 1 | 1 | 1 | 1 | 92 | 1 | 1 | 1 | 0 | 1 | 1 |
| 7 | 0 | 1 | 0 | 1 | 1 | 1 | 50 | 1 | 1 | 1 | 1 | 1 | 1 | 93 | 1 | 1 | 1 | 1 | 1 | 1 |

TABLE I-continued

| INPUT ADDRESS | ROM Outputs A | B | C | D | E | F | INPUT ADDRESS | ROM Output A | B | C | D | E | F | INPUT ADDRESS | ROM Output A | B | C | D | E | F |
|---|---|---|---|---|---|---|---|---|---|---|---|---|---|---|---|---|---|---|---|---|
| 8 | 1 | 1 | 1 | 1 | 1 | 1 | 51 | 1 | 1 | 1 | 1 | 1 | 1 | 94 | 1 | 1 | 1 | 0 | 1 | 1 |
| 9 | 1 | 1 | 1 | 1 | 1 | 1 | 52 | 0 | 1 | 1 | 0 | 1 | 1 | 95 | 1 | 1 | 1 | 1 | 1 | 1 |
| 10 | 1 | 1 | 1 | 1 | 1 | 1 | 53 | 0 | 1 | 1 | 1 | 1 | 1 | 96 | 1 | 0 | 1 | 1 | 1 | 1 |
| 11 | 1 | 1 | 1 | 1 | 1 | 1 | 54 | 0 | 1 | 1 | 0 | 1 | 1 | 97 | 1 | 0 | 0 | 1 | 1 | 1 |
| 12 | 0 | 1 | 1 | 1 | 1 | 1 | 55 | 0 | 1 | 1 | 1 | 1 | 1 | 98 | 1 | 1 | 1 | 1 | 1 | 1 |
| 13 | 0 | 1 | 0 | 1 | 1 | 1 | 56 | 0 | 0 | 1 | 0 | 1 | 1 | 99 | 1 | 0 | 0 | 1 | 1 | 1 |
| 14 | 0 | 1 | 0 | 0 | 1 | 1 | 57 | 1 | 1 | 1 | 1 | 1 | 1 | 100 | 1 | 1 | 1 | 1 | 1 | 1 |
| 15 | 0 | 1 | 0 | 1 | 1 | 1 | 58 | 1 | 1 | 1 | 1 | 1 | 1 | 101 | 1 | 1 | 0 | 1 | 1 | 1 |
| 16 | 1 | 1 | 1 | 1 | 1 | 1 | 59 | 1 | 1 | 1 | 1 | 1 | 1 | 102 | 1 | 1 | 1 | 1 | 1 | 1 |
| 17 | 1 | 1 | 1 | 1 | 1 | 1 | 60 | 0 | 1 | 1 | 0 | 1 | 1 | 103 | 1 | 1 | 0 | 1 | 1 | 1 |
| 18 | 1 | 1 | 1 | 1 | 1 | 1 | 61 | 0 | 1 | 1 | 1 | 1 | 1 | 104 | 1 | 1 | 1 | 1 | 1 | 1 |
| 19 | 1 | 1 | 1 | 1 | 1 | 1 | 62 | 0 | 1 | 1 | 0 | 1 | 1 | 105 | 1 | 1 | 1 | 1 | 1 | 1 |
| 20 | 0 | 1 | 1 | 0 | 1 | 1 | 63 | 0 | 1 | 1 | 1 | 1 | 1 | 106 | 1 | 1 | 1 | 1 | 1 | 1 |
| 21 | 1 | 1 | 1 | 1 | 1 | 1 | 64 | 1 | 1 | 1 | 1 | 1 | 1 | 107 | 1 | 1 | 1 | 1 | 1 | 1 |
| 22 | 0 | 1 | 1 | 0 | 1 | 1 | 65 | 1 | 0 | 0 | 1 | 1 | 1 | 108 | 1 | 1 | 1 | 1 | 1 | 1 |
| 23 | 0 | 1 | 1 | 1 | 1 | 1 | 66 | 1 | 1 | 1 | 1 | 1 | 1 | 109 | 1 | 1 | 1 | 1 | 1 | 1 |
| 24 | 1 | 1 | 1 | 0 | 1 | 1 | 67 | 1 | 0 | 0 | 1 | 1 | 1 | 110 | 1 | 1 | 1 | 1 | 1 | 1 |
| 25 | 1 | 1 | 1 | 1 | 1 | 1 | 68 | 1 | 1 | 1 | 1 | 1 | 1 | 111 | 1 | 1 | 0 | 1 | 1 | 1 |
| 26 | 1 | 1 | 1 | 1 | 1 | 1 | 69 | 1 | 1 | 1 | 1 | 1 | 1 | 112 | 1 | 0 | 1 | 0 | 1 | 1 |
| 27 | 1 | 1 | 1 | 1 | 1 | 1 | 70 | 1 | 1 | 1 | 1 | 1 | 1 | 113 | 1 | 0 | 1 | 1 | 1 | 1 |
| 28 | 0 | 1 | 1 | 0 | 1 | 1 | 71 | 1 | 1 | 0 | 1 | 1 | 1 | 114 | 1 | 1 | 1 | 1 | 1 | 1 |
| 29 | 0 | 1 | 1 | 1 | 1 | 1 | 72 | 1 | 1 | 1 | 1 | 1 | 1 | 115 | 1 | 0 | 1 | 1 | 1 | 1 |
| 30 | 0 | 1 | 1 | 0 | 1 | 1 | 73 | 1 | 1 | 1 | 1 | 1 | 1 | 116 | 1 | 1 | 1 | 0 | 1 | 1 |
| 31 | 0 | 1 | 1 | 1 | 1 | 1 | 74 | 1 | 1 | 1 | 1 | 1 | 1 | 117 | 1 | 1 | 1 | 1 | 1 | 1 |
| 32 | 1 | 1 | 1 | 1 | 1 | 1 | 75 | 1 | 1 | 1 | 1 | 1 | 1 | 118 | 1 | 1 | 1 | 0 | 1 | 1 |
| 33 | 1 | 1 | 1 | 1 | 1 | 1 | 76 | 1 | 1 | 1 | 1 | 1 | 1 | 119 | 1 | 1 | 1 | 1 | 1 | 1 |
| 35 | 1 | 1 |   | 1 | 1 | 1 | 78 | 1 | 1 | 1 | 1 | 1 | 1 | 121 | 1 | 0 | 1 | 1 | 1 | 1 |
| 36 | 1 | 1 | 1 | 1 | 1 | 1 | 79 | 1 | 1 | 0 | 1 | 1 | 1 | 122 | 1 | 1 | 1 | 1 | 1 | 1 |
| 37 | 1 | 1 | 1 | 1 | 1 | 1 | 80 | 1 | 0 | 1 | 0 | 1 | 1 | 123 | 1 | 0 | 1 | 1 | 1 | 1 |
| 38 | 1 | 1 | 1 | 1 | 1 | 1 | 81 | 1 | 1 | 1 | 1 | 1 | 1 | 124 | 1 | 1 | 1 | 0 | 1 | 1 |
| 39 | 1 | 1 | 1 | 1 | 1 | 1 | 82 | 1 | 1 | 1 | 1 | 1 | 1 | 125 | 1 | 1 | 1 | 1 | 1 | 1 |
| 40 | 1 | 1 | 1 | 1 | 1 | 1 | 83 | 1 | 0 | 1 | 1 | 1 | 1 | 126 | 1 | 1 | 1 | 0 | 1 | 1 |
| 41 | 1 | 1 | 1 | 1 | 1 | 1 | 84 | 1 | 1 | 1 | 1 | 1 | 1 | 127 | 1 | 1 | 1 | 1 | 1 | 1 |
| 42 | 1 | 1 | 1 | 1 | 1 | 1 | 85 | 1 | 1 | 1 | 1 | 1 | 1 | 128 | 1 | 1 | 1 | 1 | 1 | 1 |
| 129 | 1 | 1 | 0 | 1 | 1 | 1 | 172 | 1 | 1 | 1 | 1 | 1 | 1 | 215 | 1 | 1 | 1 | 1 | 1 | 1 |
| 130 | 1 | 1 | 1 | 1 | 1 | 1 | 173 | 1 | 1 | 1 | 1 | 1 | 1 | 216 | 1 | 0 | 1 | 0 | 1 | 1 |
| 131 | 0 | 0 | 0 | 1 | 1 | 1 | 174 | 1 | 1 | 1 | 1 | 1 | 1 | 217 | 1 | 0 | 1 | 1 | 1 | 1 |
| 132 | 1 | 1 | 1 | 1 | 1 | 1 | 175 | 1 | 1 | 1 | 1 | 1 | 1 | 218 | 1 | 1 | 1 | 1 | 1 | 1 |
| 133 | 0 | 1 | 0 | 1 | 1 | 1 | 176 | 1 | 1 | 1 | 1 | 1 | 1 | 219 | 1 | 0 | 1 | 1 | 1 | 1 |
| 134 | 1 | 1 | 1 | 1 | 1 | 1 | 177 | 1 | 1 | 1 | 1 | 1 | 1 | 220 | 1 | 1 | 1 | 0 | 1 | 1 |
| 135 | 0 | 1 | 0 | 1 | 1 | 1 | 178 | 1 | 1 | 1 | 1 | 1 | 1 | 221 | 1 | 1 | 1 | 1 | 1 | 1 |
| 136 | 1 | 1 | 1 | 1 | 1 | 1 | 179 | 1 | 1 | 1 | 1 | 1 | 1 | 222 | 1 | 1 | 1 | 0 | 1 | 1 |
| 137 | 1 | 1 | 1 | 1 | 1 | 1 | 180 | 1 | 1 | 1 | 1 | 1 | 1 | 223 | 1 | 1 | 1 | 1 | 1 | 1 |
| 138 | 1 | 1 | 1 | 1 | 1 | 1 | 181 | 1 | 1 | 1 | 1 | 1 | 1 | 224 | 1 | 0 | 0 | 0 | 1 | 1 |
| 139 | 1 | 1 | 1 | 1 | 1 | 1 | 182 | 1 | 1 | 1 | 1 | 1 | 1 | 225 | 1 | 0 | 0 | 1 | 1 | 1 |
| 140 | 1 | 1 | 1 | 1 | 1 | 1 | 183 | 0 | 1 | 1 | 1 | 1 | 1 | 226 | 1 | 1 | 1 | 1 | 1 | 1 |
| 141 | 0 | 1 | 0 | 1 | 1 | 1 | 184 | 1 | 1 | 1 | 1 | 1 | 1 | 227 | 1 | 0 | 0 | 1 | 1 | 1 |
| 142 | 1 | 1 | 1 | 1 | 1 | 1 | 185 | 1 | 1 | 1 | 1 | 1 | 1 | 228 | 1 | 1 | 1 | 1 | 1 | 1 |
| 143 | 0 | 1 | 0 | 1 | 1 | 1 | 186 | 1 | 1 | 1 | 1 | 1 | 1 | 229 | 1 | 1 | 0 | 1 | 1 | 1 |
| 144 | 1 | 1 | 1 | 1 | 1 | 1 | 187 | 1 | 1 | 1 | 1 | 1 | 1 | 230 | 1 | 1 | 1 | 1 | 1 | 1 |
| 145 | 1 | 1 | 1 | 1 | 1 | 1 | 188 | 1 | 1 | 1 | 1 | 1 | 1 | 231 | 1 | 1 | 0 | 1 | 1 | 1 |
| 146 | 1 | 1 | 1 | 1 | 1 | 1 | 189 | 0 | 1 | 1 | 1 | 1 | 1 | 232 | 1 | 1 | 1 | 1 | 1 | 1 |
| 147 | 1 | 1 | 1 | 1 | 1 | 1 | 190 | 1 | 1 | 1 | 1 | 1 | 1 | 233 | 1 | 1 | 1 | 1 | 1 | 1 |
| 148 | 1 | 1 | 1 | 1 | 1 | 1 | 191 | 0 | 1 | 1 | 1 | 1 | 1 | 234 | 1 | 1 | 1 | 1 | 1 | 1 |
| 149 | 0 | 1 | 1 | 1 | 1 | 1 | 192 | 1 | 0 | 1 | 1 | 1 | 1 | 235 | 1 | 1 | 1 | 1 | 1 | 1 |
| 150 | 1 | 1 | 1 | 1 | 1 | 1 | 193 | 1 | 0 | 0 | 1 | 1 | 1 | 236 | 1 | 1 | 1 | 1 | 1 | 1 |
| 151 | 0 | 1 | 1 | 1 | 1 | 1 | 194 | 1 | 1 | 1 | 1 | 1 | 1 | 237 | 1 | 1 | 0 | 1 | 1 | 1 |
| 152 | 1 | 1 | 1 | 1 | 1 | 1 | 195 | 1 | 0 | 0 | 1 | 1 | 238 | 1 | 1 | 1 | 1 | 1 | 1 | |
| 153 | 1 | 1 | 1 | 1 | 1 | 1 | 196 | 1 | 1 | 1 | 1 | 1 | 1 | 239 | 1 | 1 | 0 | 1 | 1 | 1 |
| 154 | 1 | 1 | 1 | 1 | 1 | 1 | 197 | 1 | 1 | 0 | 1 | 1 | 1 | 240 | 1 | 0 | 0 | 1 | 1 | 1 |
| 155 | 1 | 1 | 1 | 1 | 1 | 1 | 198 | 1 | 1 | 1 | 1 | 1 | 1 | 241 | 1 | 0 | 1 | 1 | 1 | 1 |
| 156 | 1 | 1 | 1 | 1 | 1 | 1 | 199 | 1 | 1 | 0 | 1 | 1 | 1 | 242 | 1 | 1 | 1 | 1 | 1 | 1 |
| 157 | 0 | 1 | 1 | 1 | 1 | 1 | 200 | 1 | 1 | 1 | 1 | 1 | 1 | 243 | 1 | 0 | 1 | 1 | 1 | 1 |
| 158 | 1 | 1 | 1 | 1 | 1 | 1 | 201 | 1 | 1 | 1 | 1 | 1 | 1 | 244 | 1 | 1 | 1 | 0 | 1 | 1 |
| 159 | 0 | 1 | 1 | 1 | 1 | 1 | 202 | 1 | 1 | 1 | 1 | 1 | 1 | 245 | 1 | 1 | 1 | 1 | 1 | 1 |
| 160 | 1 | 1 | 1 | 1 | 1 | 1 | 203 | 1 | 1 | 1 | 1 | 1 | 1 | 246 | 1 | 1 | 1 | 0 | 1 | 1 |
| 161 | 1 | 1 | 1 | 1 | 1 | 1 | 204 | 1 | 1 | 1 | 1 | 1 | 1 | 247 | 1 | 1 | 1 | 1 | 1 | 1 |
| 162 | 1 | 1 | 1 | 1 | 1 | 1 | 205 | 1 | 0 | 1 | 1 | 1 | 1 | 248 | 1 | 0 | 1 | 0 | 1 | 1 |
| 163 | 1 | 1 | 1 | 1 | 1 | 1 | 206 | 1 | 1 | 1 | 1 | 1 | 1 | 249 | 1 | 0 | 1 | 1 | 1 | 1 |
| 164 | 1 | 1 | 1 | 1 | 1 | 1 | 207 | 1 | 1 | 0 | 1 | 1 | 1 | 250 | 1 | 1 | 1 | 1 | 1 | 1 |
| 165 | 1 | 1 | 1 | 1 | 1 | 1 | 208 | 1 | 0 | 1 | 0 | 1 | 1 | 251 | 1 | 0 | 1 | 1 | 1 | 1 |
| 166 | 1 | 1 | 1 | 1 | 1 | 1 | 209 | 1 | 0 | 1 | 1 | 1 | 1 | 252 | 1 | 1 | 1 | 0 | 1 | 1 |
| 167 | 1 | 1 | 1 | 1 | 1 | 1 | 210 | 1 | 1 | 1 | 1 | 1 | 1 | 253 | 1 | 1 | 1 | 1 | 1 | 1 |
| 168 | 1 | 1 | 1 | 1 | 1 | 1 | 211 | 1 | 0 | 1 | 1 | 1 | 1 | 254 | 1 | 1 | 1 | 0 | 1 | 1 |
| 169 | 1 | 1 | 1 | 1 | 1 | 1 | 212 | 1 | 1 | 1 | 0 | 1 | 1 | 255 | 1 | 1 | 1 | 1 | 1 | 1 |
| 170 | 1 | 1 | 1 | 1 | 1 | 1 | 213 | 1 | 1 | 1 | 1 | 1 | 1 |   |   |   |   |   |   |   |
| 171 | 1 | 1 | 1 | 1 | 1 | 1 | 214 | 1 | 1 | 1 | 1 | 1 | 1 |   |   |   |   |   |   |   |

The stages A, B, C and D were implemented to perform thinning operations, while the stages E and F were implemented to perform filling operations on the fingerprint of FIG. 6. While the enhanced results, as seen in FIG. 6, are not necessarily optimum, twenty seven cascaded enhancement stages were used to obtain that enhanced result. In terms of the six different types of stages in Table I, these twenty seven sequential stages were E, E, E, A, B, C, D, A, B, C, D, F, E, E, E, A, B, C, D, A, B, C, D, A, B, C and D.

Figure 7:
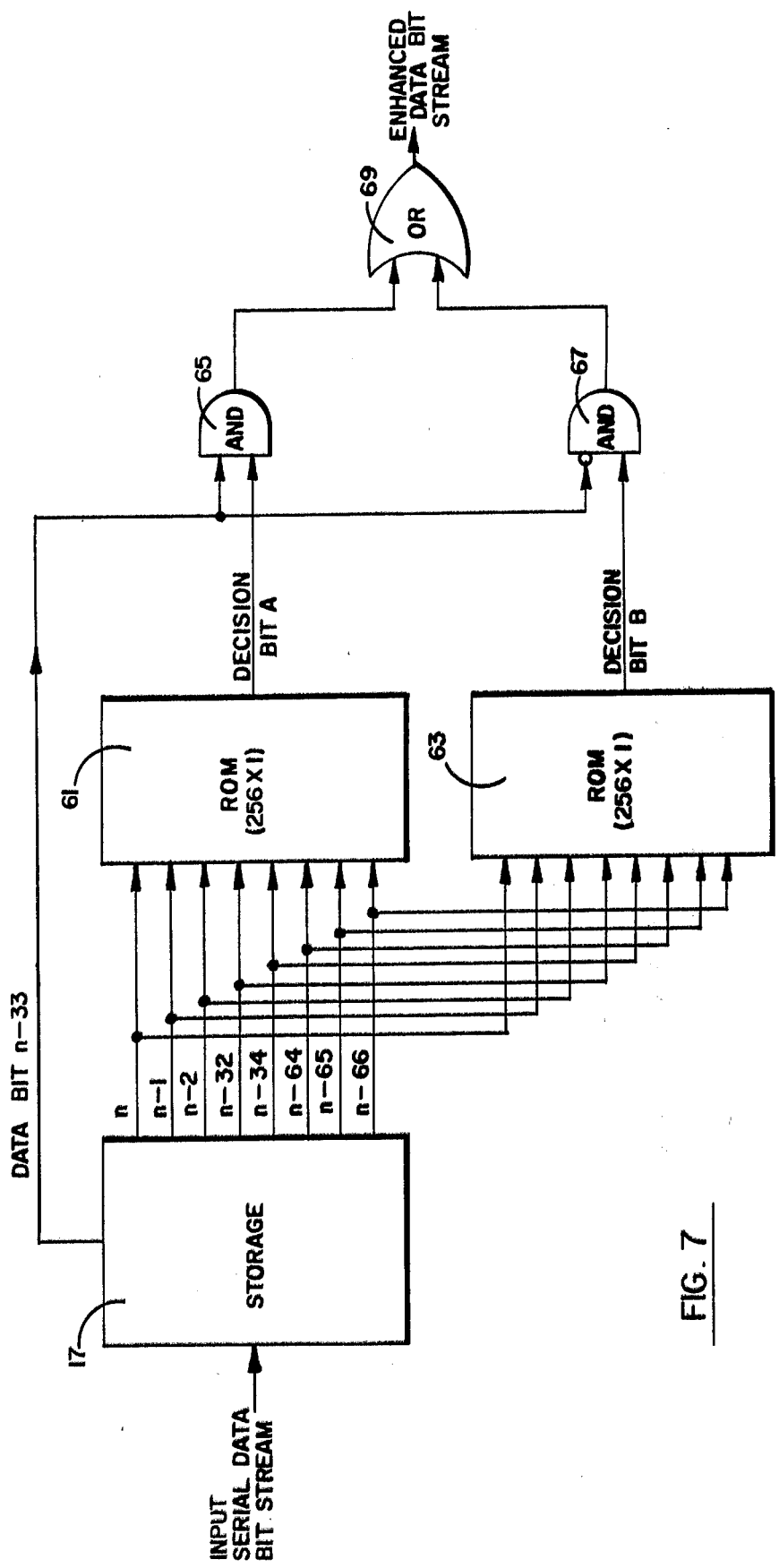
FIG. 7 illustrates a block diagram of another embodiment of an enhancement stage which can be used to perform a smoothing operation on the input two-dimensional bianry data.

FIG. 7 illustrates another embodiment of an enhancement stage, which embodiment may be used to perform a smoothing or mixed type of operation on the input two-dimensional binary data. Essentially, in the embodiment of FIG. 7, the decision as to whether or not the data bit or data signal will be changed is made as a function of both the input state of the data bit and the pattern of the eight bits associated with the input data bit.

In FIG. 7, the input serial data bit stream is applied to storage unit 17 to obtain the data bit n-33 and the address bits: n, n-1, n-32, n-34, n-64, n-65 and n-66, as discussed previously. These address bits are used to parallel address ROMs 61 and 63 to cause these ROMs to respectively provide decision bits or signals A and B to AND gates 65 and 67. Each of the ROMs 61 and 63 has 256 one bit address locations and is similar to the ROM 47 (FIG. 4). However, the ROMs 61 and 63 do not necessarily store the same bit information in the corresponding address locations.

The data bit or data signal n-33 is applied to a non-inverting second input of AND gate 65 and to an inverting second input of AND gate 67. In this manner, when the data bit is a binary 1, the AND gate 65 is enabled to pass the decision bit or signal A from the ROM 61 to a first input of an OR gate 69. In a like manner, when the data bit is a binary 0, the AND gate 67 is enabled to pass the decision bit or signal B from the ROM 63 to a second input of the OR gate 69. It can therefore be seen that the enhanced data bit stream, which appears at the output of the OR gate 69, is a selective function of the address bits and the state of the input data bit n-33.

It should be noted that the ROMs 61 and 63 shown in FIG. 7 could be combined into one ROM having 512 address locations of one bit each. This 512 bit ROM could develop decision bits A and B as a function of the pattern or states of the address bits. Furthermore, a 512 bit ROM could be programmed to be addressed by the combined data bit and address bits to directly develop the enhanced data bit stream. This implementation would eliminate the AND gates 65 and 67 and the OR gate 69.

The enhancement stage of FIG. 7 is implemented, by means of the ROMs 61 and 63, to perform a smoothing operation on the input binary data bit stream. This smoothing operation removes or minimizes minor irregularities from the input binary data in one stage, rather than in two stages, by selectively performing fill and thin operations on the input data bit stream. Based upon the binary state of the data bit and the pattern of the associated address bits, the circuit of FIG. 7 decides whether to force the data bit to be a binary 1, to be a binary 0 or to not change the state of the data bit at all. Consequently, each bit in the output enhanced data bit stream is a function of the associated address bits and the state of the associated input data bit n-33. Illustrations of different functions of the smoothing operation that can be performed by the circuit of FIG. 7 are shown in FIGS. 8A, 8B, 9A, 10A and 10B.

FIGS. 8A and 8B illustrate different states of the input data bit (the center bit) with a common first address pattern (the bits surrounding the data bit). For this illustrated address pattern, the ROMs 61 and 63 would be programmed to cause the output of the OR gate 69 to develop a binary 0. As a result, the enhancement stage of FIG. 7 would perform a thinning operation for the address pattern of FIGS. 8A and 8B, regardless of the binary state of the data bit.

FIGS. 9A and 9B illustrate different states of the data bit with a common second address pattern. However, in this case the pattern of the address bits is such that the enhancement stage of FIG. 7 would perform a filling operation, regardless of the state of the data bit. Consequently, the ROMs 61 and 63 would be programmed to cause the output of the OR gate 69 to develop a binary 1 with that pattern of address bits.

FIGS. 10A and 10B again illustrate different states of the data bit with a common third address pattern. However, with this pattern of address bits, for example, it is desired to not change the state of the data bit. As a result, the ROMs 61 and 63 would be programmed to cause the OR gate 69 to repeat the existing state of the input data bit.

It should again be stressed that the number of enhancement stages to be used is arbitrary. However, the number of stages used directly affects the results. Some applications, like in the enhancement of a fingerprint, require more stages than other applications to achieve the desired enhancement. In an optical character recognition application for enhancing letters and numbers, only four enhancement stages were chosen by applicants to be used to achieve the desired enhancement. However, a larger or smaller number of enhancement stages, even as little as one stage, could have been used.

The invention thus provides in one embodiment, a system for enhancing two-dimensional binary data whereby a determination is made in each enhancement stage being used on whether or not a preselected bit in a window should be changed as a function of the pattern of the remaining bits in that window. In that embodiment the two-dimensional binary data is selectively passed through a window of a storage unit which includes a data bit position and address positions. A ROM reads out a decision bit as a function of the pattern of the bits in the address positions of the window. The states of the decision bit and data bit enable a gating circuit to determine whether or not the state of the bit from the data bit position will be changed. The output of the gating circuit is the enhanced data bit stream which may be further enhanced before being utilized for subsequent pattern recognition processing.

While the salient features have been illustrated and described in several embodiments of the invention, it should be readily apparent to those skilled in the art that many changes and modifications can be made in those embodiments without departing from the spirit and scope of the invention. For example, the embodiments of FIGS. 4, 5 and 7 could be modified to operate with multilevel quantized data, instead of binary data, by using a larger number of address bits and increasing the storage capacity of each ROM; an enhancement system could be implemented using combinations of at least the three illustrated embodiments of FIGS. 4, 5 and 7; and, in the embodiments of FIGS. 4, 5 and 7, more than one bit could be used for each of the decision and data signals. It is therefore intended to cover all such changes and modifications of the invention that fall within the spirit and scope of the invention as set forth in the appended claims.

We claim:

1. A system for enhancing the bits in two-dimensional binary data, said system comprising:

means for sequentially storing a data bit and bits associated therewith in preselected storage locations; and means for sequentially developing an output bit for each data bit, the state of the output bit being a function of the pattern of the bits stored in the preselected storage locations, said developing means comprising memory means for developing first and second decision bits as a function of the states of the bits associated with the data bit and gating means for selecting one of the first and second decision bits for the output bit as a function of the binary state of the data bit, said gating means comprising:
 a first gate circuit for developing the output bit;
 a second gate circuit for passing the first decision bit through said first gate circuit as the output bit when the data bit is in a first binary state; and
 a third gate circuit for passing the second decision bit through the first gate circuit as the output bit when the data bit is in a second binary state.

2. The system of claim 1 wherein:
said first gate circuit is an OR gate; and
said second and third gate circuits are AND gates.

3. A system for enhancing the bits in two-dimensional binary data, said system comprising:
 means for sequentially storing a data bit and bits associated therewith in preselected storage locations; and
 means for sequentially developing an output bit for each data bit, the state of the output bit being a function of the pattern of the bits stored in the preselected storage locations, said developing means comprising memory means for developing first and second decision bits as a function of the states of the bits associated with the data bit and gating means for selecting one of the first and second decision bits for the output as a function of the binary state of the data bit, said memory means comprising:
 a first memory circuit responsive to the states of the bits associated with the data bit for developing the first decision bit; and
 a second memory circuit responsive to the states of the bits associated with the data bit for developing the second decision bit.

4. The system of claim 3 wherein said first and second memory circuits are read only memory circuits.

5. The system of claim 3 wherein said gating means comprises:
 a first gate circuit for developing the output bit;
 a second gate circuit for passing the first decision bit through said first gate circuit as the output bit when the data bit is in a first binary state; and
 a third gate circuit for passing the second decision bit through the first gate circuit as the output bit when the data bit is in a second binary state.

6. The system of claim 5 wherein:
said first gate circuit is an OR gate; and
said second and third gate circuits are AND gates.

* * * * *

UNITED STATES PATENT AND TRADEMARK OFFICE
CERTIFICATE OF CORRECTION

PATENT NO. : 4,003,024
DATED : January 11, 1977
INVENTOR(S) : J. P. Riganati and V. A. Vitols It is certified that error appears in the above-identified patent and that said Letters Patent are hereby corrected as shown below:

Column 2, lines 22 and 23, change "recognition" to -- least --
         lines 45 and 46, delete "recognition"
         line 47, change "recongition" to -- recognition --.
Column 4, line 31, after "example" insert a comma (,)
Columns 6, 7 and 8, TABLE I is corrected in the following portions to now read:

| INPUT ADDRESS | ROM Output | | | | | |
|---|---|---|---|---|---|---|
| | A | B | C | D | E | F |
| 77 | 1 | 1 | 0 | 1 | 1 | 1 |
| 86 | 1 | 1 | 1 | 0 | 1 | 1 |
| 120 | 1 | 0 | 1 | 0 | 1 | 1 |
| 195 | 1 | 0 | 0 | 1 | 1 | 1 |
| 238 | 1 | 1 | 1 | 1 | 1 | 1 |

Column 9, line 58, after "9A," and before "10A" insert -- 9B, --
Column 12, line 6, after "output" insert -- bit --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks